United States Patent
Zhang et al.

(10) Patent No.: US 11,236,206 B2
(45) Date of Patent: Feb. 1, 2022

(54) ETHOXYLATED PENTAERYTHRITOL CORE HYPERBRANCHED POLYMER WITH DITHIOCARBOXYLATE AS SIDE GROUP AND TERMINAL GROUP AND APPLICATIONS OF CHELATING HEAVY METALS

(71) Applicants: Tongji University, Shanghai (CN); Shandong Xintai Water Treatment Technology Co., Ltd., Shandong (CN)

(72) Inventors: Bingru Zhang, Shanghai (CN); Jin Cui, Shandong (CN); Fengting Li, Shanghai (CN)

(73) Assignees: Tongji University, Shanghai (CN); Shandong Xintai Water Treatment Technology Co., Ltd., Shandong (CN)

( * ) Notice: Subject to any disclaimer, the term of this patent is extended or adjusted under 35 U.S.C. 154(b) by 0 days.

(21) Appl. No.: 16/994,678

(22) Filed: Aug. 17, 2020

(65) Prior Publication Data

US 2020/0377671 A1    Dec. 3, 2020

(30) Foreign Application Priority Data

Dec. 2, 2019 (CN) .......................... 201911214421.3

(51) Int. Cl.
| | |
|---|---|
| *C08G 83/00* | (2006.01) |
| *C02F 1/52* | (2006.01) |
| *C02F 1/56* | (2006.01) |
| *C02F 101/20* | (2006.01) |

(52) U.S. Cl.
CPC .......... *C08G 83/005* (2013.01); *C02F 1/5272* (2013.01); *C02F 1/56* (2013.01); *C02F 2101/20* (2013.01)

(58) Field of Classification Search
USPC ......................................... 510/446; 210/688
See application file for complete search history.

(56) References Cited

U.S. PATENT DOCUMENTS

| | | | | |
|---|---|---|---|---|
| 8,211,389 B2 * | 7/2012 | Zinn | ........................ | C02F 1/56 423/42 |
| 9,499,420 B2 * | 11/2016 | Ross | ........................ | C02F 1/56 |
| 2008/0038169 A1 * | 2/2008 | Phan | ........................ | C22B 3/44 423/120 |
| 2018/0215636 A1 * | 8/2018 | Zhang | .................. | C08G 83/004 |

FOREIGN PATENT DOCUMENTS

JP        2008-18311 A  *  1/2008  ................ C02F 1/62

OTHER PUBLICATIONS

English Translation JP 2008-18311 "Treating Agent for Heavy Metal containing Waste Water and Method for Wastewater Treatment using the same", Kobayashi et al. (Year: 2008).*

\* cited by examiner

*Primary Examiner* — Nina Bhat

(57) ABSTRACT

An ethoxylated pentaerythritol core hyperbranched polymer with dithiocarboxylate as side group and terminal group and its applications as a heavy metal chelating agent are disclosed, which relates to the field of chemical and environmental protection technology. The hyperbranched polymer has a chemical formula of $C[CH_2OCH_2CH_2OCOCH_2CH_2N(CSSM)CH_2CH_2NHCSSM]_4$, wherein M is $Na^+$, $K^+$ or $NH_4^+$. A preparation method of the hyperbranched polymer is simple, the raw materials are easily available, and it is easy to be industrialized. The hyperbranched polymer is able to be used as a heavy metal chelating agent. Its special three-dimensional space structure is able to alternately chelate with heavy metals to form a large three-dimensional molecular conjugate with low solubility, strong stability, and compactness, which is able to effectively treat wastewater and waste containing heavy metals.

10 Claims, No Drawings

ETHOXYLATED PENTAERYTHRITOL CORE HYPERBRANCHED POLYMER WITH DITHIOCARBOXYLATE AS SIDE GROUP AND TERMINAL GROUP AND APPLICATIONS OF CHELATING HEAVY METALS

CROSS REFERENCE OF RELATED APPLICATION

The present invention claims priority under 35 U.S.C. 119(a-d) to CN 201911214421.3, filed Dec. 2, 2019.

BACKGROUND OF THE PRESENT INVENTION

Field of Invention

The present invention relates to the field of chemical industry and environmental protection technology, and more particularly to an ethoxylated pentaerythritol core hyperbranched polymer with dithiocarboxylate as side group and terminal group and its applications of chelating heavy metals.

Description of Related Arts

In recent years, heavy metal pollution has become the most important environmental crisis in China, posing a serious threat to the ecosystem and the health of the people. "Arsenic poison", "blood lead", "cadmium rice" and other events have occurred frequently, so that heavy metal pollution has become one of the most concerned public events. With the intensification of supervision, solving heavy metal pollution has become an urgent environmental protection demand.

Heavy metal wastewater treatment technologies include neutralization precipitation method, chelation precipitation method, adsorption method, ion exchange method, reverse osmosis method and electrochemical method. The neutralization precipitation method is for the treatment of heavy metal wastewater, due to the limitation of its hydroxide solubility product, the discharged wastewater is difficult to meet the standard, and the treated residue is easily re-released with the change of PH value of the environment, causing secondary pollution. The adsorption method has the problems that the amount of waste residues is large and the residues are difficult to handle. All of the ion exchange method, the reverse osmosis method and the electrochemical method have the problems of high investment and high processing cost and are not suitable for the treatment of large amounts of heavy metal wastewater. The chelation precipitation method, due to the simple process, high efficiency and economy, is suitable for the treatment of large-scale heavy metal wastewater.

The chelating precipitation method requires that not only the used organic chelating agent is able to effectively chelate heavy metal ions, but also the generated chelate precipitation is insoluble in water and is able to be easily separated from the wastewater. Dithiocarboxylate ($CSS^-$, DTC for short) organic chelating agents are applied to the treatment of heavy metal wastewater by virtue of their strong and stable insoluble deposition combined with heavy metals. Moreover, compared with inorganic precipitants, the chelating precipitation method is able to direct treat complex state heavy metals, its pH adaptation range becomes wider, its heavy metal residues become lower, and its sludge decreases.

At present, there are three main types of dithiocarboxylate (DTC) organic chelating agents: single DTC small-molecular organic chelating agent containing 1 DTC group, multi DTC small-molecular organic chelating agent containing more than 2 DTC groups and DTC linear high-molecular polymer chelating agent.

The single DTC small-molecular organic chelating agent, such as N,N'-dimethyldithiocarboxylate and N,N'-diethyldithiocarboxylate, has only one DTC group in the molecular structure due to small molecules, so that the chelating ligands formed with heavy metals are small in molecular weight, light in density, suspended in water and difficult to deposit, and require a large amount of flocculant to help settling, and the treatment effect is limited. Therefore, it is difficult to stably meet the current emission standards.

The multi-DTC small-molecular chelating agent is usually defined by grafting small molecular polyamino compound with multiple DTC groups, such as disodium N,N-bis-(dithiocarboxy) ethylenediamine, disodium N,N'-bis-(dithiocarboxy) piperazine, and trisodium N,N',N''-tris-(dithiocarboxy) diethylenetriamine. Due to the small molecular structure, its DTC group is completely exposed, and its utilization efficiency is high. The multi-DTC small-molecular chelating agent is able to be combined with dithiocarboxylate from different molecules through a same heavy metal ion to form a larger molecular chelate precipitation. Compared with a single DTC small molecular chelating agent, the deposition volume of the multi-DTC small-molecular chelating agent becomes larger, the density thereof increases, and the settlement thereof is also accelerated; and however, the chelate precipitation is relatively loose, and is very easy to be broken under stirring or aeration conditions. Therefore, it is still necessary to add a flocculant to help settling in the multi-DTC small-molecular chelating agent.

The DTC linear high-molecular polymer chelating agent is configured to graft multiple DTCs, such as polyethyleneimine, polyacrylamide and starch, on the amino or hydroxyl of the linear polymer. Due to the large molecular weight and multiple DTC groups on the molecular chain, it can quickly flocculate after chelating with heavy metals to form a large, dense, fast settling, easy to be separated deposit, showing good flocculation. However, due to large molecular, the linear high-molecular chain is easy to curl, the DTC group is unable to be completely exposed to cause steric hindrance. Therefore, the utilization efficiency of the DTC group is low and the dosage of the agent is large. In addition, the steric hindrance of the high-molecular chain reduces the utilization efficiency of the chelating group, causing flocculus carry excess negative charge and repel each other, which affects their flocculation and settling performance in reverse.

Therefore, the more chelating groups provided in molecules of the heavy metal chelating agent, the higher the efficiency of chelating heavy metals; the more fully exposed the chelating groups provided in molecules of the heavy metal chelating agent, the smaller the steric hindrance of the chelating ligand formed with heavy metal ions, the larger the volume of flocs formed, the better the flocculation and settlement effect.

SUMMARY OF THE PRESENT INVENTION

An object of the present invention is to provide a heavy metal chelating agent, which has high chelation efficiency and good flocculation settling effect.

To achieve the above object, the present invention provides an ethoxylated pentaerythritol core hyperbranched polymer with dithiocarboxylate as side group and terminal group, wherein the hyperbranched polymer takes dithiocarboxylate as side functional group and terminal functional group, and ethoxylated pentaerythritol as a core; it has three-dimensional structural characteristics of multi-chelating functional groups and multi-branched chains; it has dual advantages of high chelating efficiency of DTC small molecule chelating agent and rapid settlement of DTC linear polymer chelating agent, and there is no need to add a coagulant aid while processing heavy metals.

The ethoxylated pentaerythritol core hyperbranched polymer with dithiocarboxylate as side group and terminal group provided by the present invention has a chemical formula of $C[CH_2OCH_2CH_2OCOCH_2CH_2N(CSSM)CH_2CH_2NHCSSM]_4$, wherein M is $Na^+$, $K^+$ or $NH_4^+$; and a structural formula of Also, the present invention provides a preparation method of the ethoxylated pentaerythritol core hyperbranched polymer with dithiocarboxylate as side group and terminal group mentioned above, the preparation method comprising steps of:

(1) under nitrogen protection, adding ethylenediamine (EDA) and a first amount of low-carbon alcohol to a reaction vessel with a stirrer, a reflux device and a thermometer, evenly stirring, slowly adding a low-carbon alcohol solution containing ethoxylated pentaerythritol tetraacrylate (EO-PETA) drop by drop, performing a first addition reaction; and then removing low-carbon alcohol solvent and excessive ethylenediamine through vacuum distillation, and obtaining a light amber viscous product, namely, an intermediate product ethoxylated pentaerythritol tetra((N-(2-aminoethyl))-3-alaninate) hyperbranched polymer (EO-PETA/EDA), wherein the first addition reaction has a reaction formula of

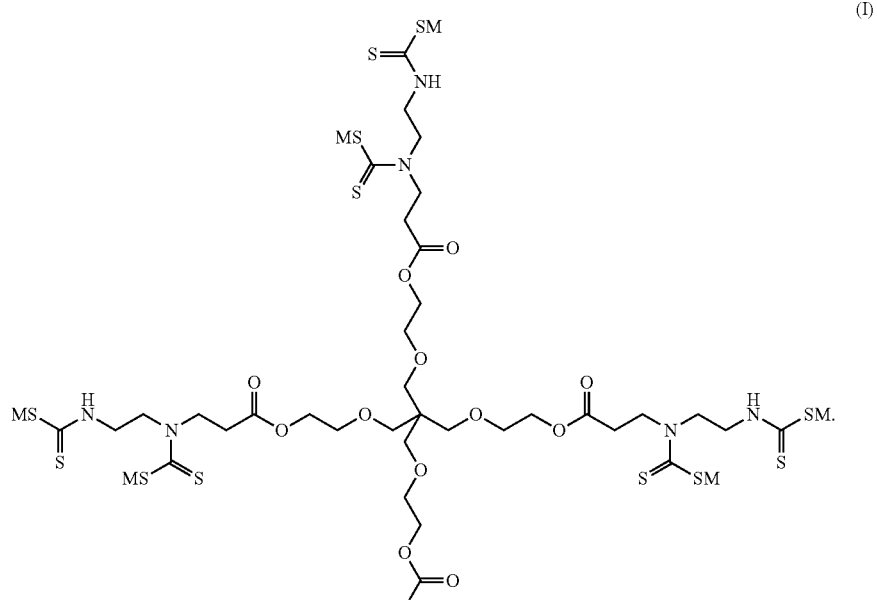

(I)

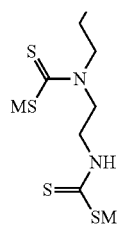

(II)

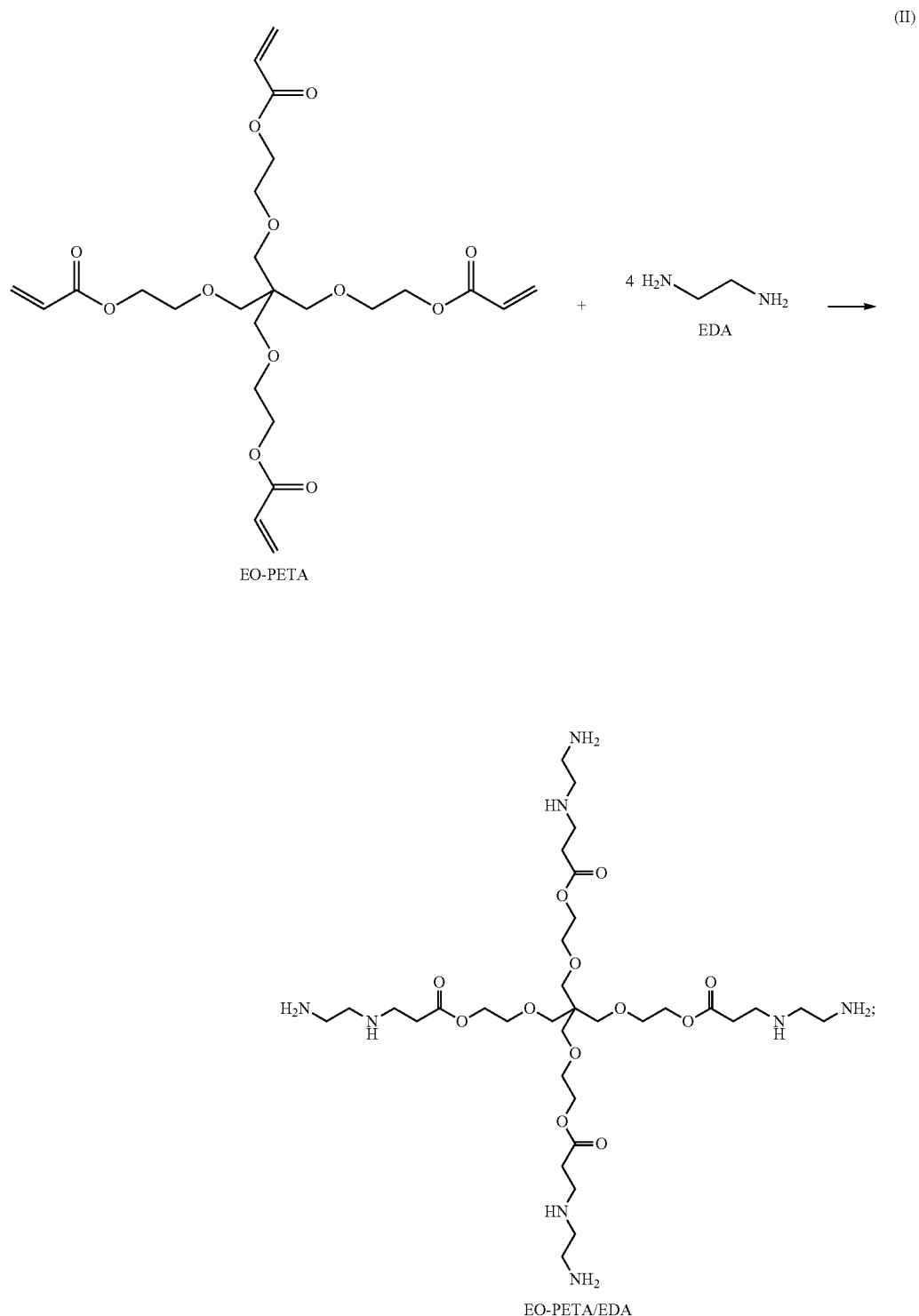

(2) slowly adding water, alkaline solution and carbon disulfide drop by drop to the ethoxylated pentaerythritol tetra((N-(2-aminoethyl))-3-alaninate) hyperbranched polymer obtained by the step of (1), performing a second addition reaction, and obtaining an aqueous solution of the ethoxylated pentaerythritol core hyperbranched polymer with dithiocarboxylate as side group and terminal group, wherein the second addition reaction has a reaction formula of

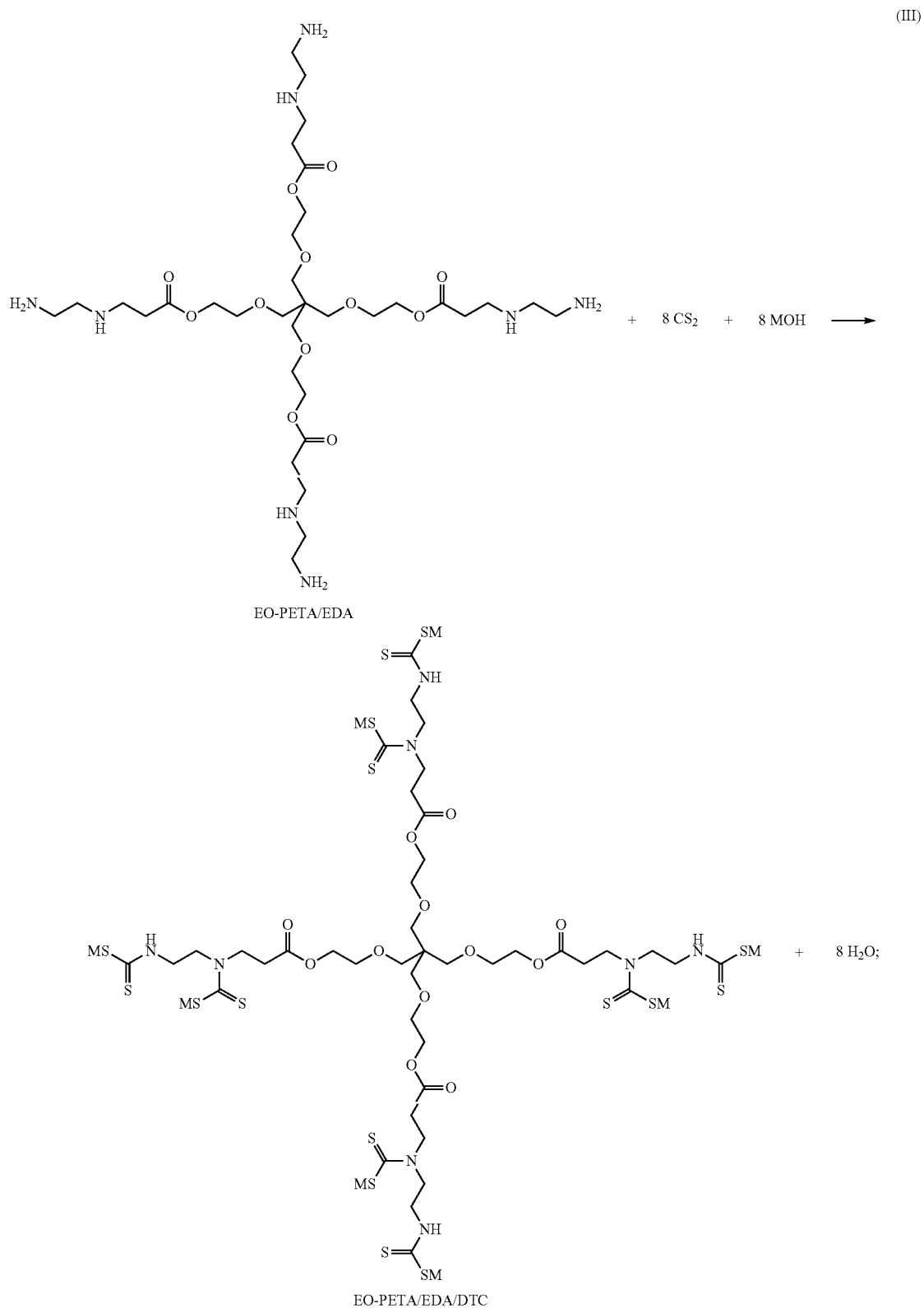
and
(3) adding a second amount of low-carbon alcohol to the aqueous solution of the ethoxylated pentaerythritol core hyperbranched polymer with dithiocarboxylate as side group and terminal group obtained by the step (3), evenly stirring, precipitating a solid product, filtering and drying the solid product to obtain the ethoxylated pentaerythritol core hyperbranched polymer with dithiocarboxylate as side group and terminal group.

Preferably, each of the first amount of low-carbon alcohol in the step (1) and the second amount of low-carbon alcohol in the step (2) is one member selected from a group consisting of methanol, ethanol, propanol and ethylene glycol.

Preferably, a molar ratio of ethylenediamine and ethoxylated pentaerythritol tetraacrylate in the step (1) is in a range of (4-10): 1.

Preferably, a temperature during dropping in the step (1) is below 25° C.

Preferably, the first addition reaction in the step (1) has a reaction temperature in a range of 25-35° C., and a reaction time in a range of 24 to 48 h.

Preferably, the vacuum distillation in the step (1) has a temperature in a range of 80 to 100° C., and a time in a range of 3 to 5 h.

Preferably, the alkaline solution in the step (2) is sodium hydroxide solution, potassium hydroxide solution or ammonium hydroxide.

Preferably, in the step (2), a molar ratio of the ethoxylated pentaerythritol tetra((N-(2-aminoethyl))-3-alaninate) hyperbranched polymer, carbon disulfide and alkaline is in a range of 1:(8.0-9.0):(8.0-9.0).

Preferably, a temperature during dropping in the step (2) is below 25° C.

Preferably, the second addition reaction in the step (2) has a reaction temperature in a range of 25-40° C., and a reaction time in a range of 3 to 5 h.

Moreover, an application of the hyperbranched polymer prepared through the above preparation method is provided, which is used as a heavy metal chelating agent for treating heavy metal wastewater and heavy metal waste.

The hyperbranched polymer provided by the present invention, having a three-dimensional structure, takes ethoxylated pentaerythritol as a core, ethylenediamine as a branched skeleton, and dithiocarboxylate as a side functional group and a terminal functional group. It has multi-branched chains and multi-dithiocarboxylate groups; has strong chelating properties of heavy metals, and is able to be used as a heavy metal chelating agent. Due to the special three-structurally spatial structure, dithiocarboxylate as its side group and terminal group is fully exposed, thereby overcoming the shortcomings of the existing linear macromolecular chelating agents, which have a large steric hindrance, low efficiency and large amount of chelating heavy metals. Moreover, due to the multi-branched chains, the hyperbranched polymer provided by the present invention is able to alternately chelate with heavy metals to form super-molecular chelating ligands with low solubility, strong stability and compactness, thereby improving the settlement rate and effect, and overcoming the loose flocs and poor settlement effect formed by the existing small molecular chelating agents. Therefore, the hyperbranched polymer provided by the present invention has the dual performance of chelation and flocculation.

For the preparation method of the hyperbranched polymer provided by the present invention, the process is simple, the raw materials are easily available, and it is easy to be industrialized.

The hyperbranched polymer provided by the present invention is used as a heavy metal chelating agent and is able to be applied to treat heavy metal wastewater and heavy metal waste. The hyperbranched polymer chelating agent of the present invention is able to be used in the treatment of heavy metal wastewater in electroplating, circuit boards, film manufacturing, metal surface finishing, battery production, coal power plants and other industries, so that it has a wide adaptability. The hyperbranched polymer quickly reacts with various heavy metal ions in wastewater at normal temperature to form a super-molecular chelating ligand that is insoluble in water, has good chemical stability, and has large and dense flocs; and then the super-molecular chelating ligand is separated and filtered by settlement, which does not need to add coagulants, and complicated devices and processes, and has good treatment effect. The hyperbranched polymer chelating agent provided by the present invention is not only suitable for heavy metal ions in free state, but also heavy metal ions in complex state. The hyperbranched polymer chelating agent of the present invention is also able to be used for various solid wastes containing heavy metal pollutants. The solid wastes are not particularly limited, as long as they are solid wastes containing heavy metals, such as fly ash, soil, sludge, waste residue and bottom mud.

DETAILED DESCRIPTION OF THE PREFERRED EMBODIMENT

The ethoxylated pentaerythritol core hyperbranched polymer with dithiocarboxylate as side group and terminal group and its applications of chelating heavy metal provided by the present invention will be described in detail with reference to embodiments as follows, but these embodiments are unable to be understood as limiting the protective scope of the present invention.

First Embodiment

Under nitrogen protection, add 48.00 g (0.8 mol) of ethylenediamine (EDA) and 48.00 g of methanol to a round-bottomed flask with a stirred, a reflux condenser, a constant pressure dropping funnel and a thermometer, stir and cool to 5° C.; and then slowly add 105.60 g (0.10 mol, 50%) of a methanol solution containing ethoxylated pentaerythritol tetraacrylate (EO-PETA) drop by drop through the constant pressure dropping funnel, react for 24 h at 25° C.; and remove excessive ethylenediamine and methanol through vacuum distillation for 4 h at 90° C., and obtain a light amber viscous product, namely, an intermediate product ethoxylated pentaerythritol tetra((N-(2-aminoethyl))-3-alaninate) hyperbranched polymer (EO-PETA/EDA); and then add 200.00 g of deionized water into the intermediate product, evenly stir, cool to 5° C., slowly add 64.00 g (50%, 0.80 mol) of sodium hydroxide aqueous solution through the constant pressure dropping funnel; and then slowly add 60.80 g (0.80 mol) of carbon disulfide through the constant pressure dropping funnel for obtaining a mixture, wherein a temperature of the mixture is less than 5° C. through controlling an addition speed during an addition process; increases the temperature to 25° C., react for 5 h at 25° C.; and then add methanol, precipitate a product, filter, and dry the product at 80° C. to obtain 145.98 g of a final product, namely, the ethoxylated pentaerythritol core hyperbranched polymer with dithiocarboxylate as side group and terminal group (EO-PETA/EDA/DTC) with a yield of 94.06%.

Chemical shifts of the characteristic absorption peak of $^{13}C$ nuclear magnetic resonance spectrum ($D_2O$) of the final product are respectively: 34.76, 40.12, 41.45, 45.19, 59.32, 65.48, 68.90, 69.52, 175.33, 211.02 and 212.93 ppm, which shows that the final product obtained by the first embodiment is a hyperbranched polymer which takes ethoxylated pentaerythritol as a core, and dithiocarboxylate as side functional group and terminal functional group.

Second Embodiment

Under nitrogen protection, add 60.00 g (1.0 mol) of ethylenediamine (EDA) and 60.00 g of methanol to a round-bottomed flask with a stirred, a reflux condenser, a constant pressure dropping funnel and a thermometer, stir and cool to 5° C.; and then slowly add 105.60 g (0.10 mol, 50%) of a methanol solution containing ethoxylated pentaerythritol tetraacrylate (EO-PETA) drop by drop through the constant pressure dropping funnel, react for 24 h at 25° C.; and remove excessive ethylenediamine and methanol through vacuum distillation for 4 h at 95° C., and obtain a light amber viscous product, namely, an intermediate product ethoxylated pentaerythritol tetra((N-(2-aminoethyl))-3-alaninate) hyperbranched polymer (EO-PETA/EDA); and then add 195.00 g of deionized water into the intermediate product, evenly stir, cool to 5° C., slowly add 68.00 g (50%, 0.85 mol) of sodium hydroxide aqueous solution through the constant pressure dropping funnel; and then slowly add 61.56 g (0.81 mol) of carbon disulfide through the constant pressure dropping funnel for obtaining a mixture, wherein a temperature of the mixture is less than 5° C. through controlling an addition speed during an addition process; and then react for 1 h at 5° C.; and then increase the temperature to 25° C. and react for 5 h at 25° C.; and then add methanol, stand overnight, precipitate a white solid, filter, and dry at 90° C. to obtain 147.22 g of a final product, namely, the ethoxylated pentaerythritol core hyperbranched polymer with dithiocarboxylate as side group and terminal group (EO-PETA/EDA/DTC) with a yield of 94.86%.

Chemical shifts of the characteristic absorption peak of $^{13}C$ nuclear magnetic resonance spectrum ($D_2O$) of the final product are respectively: 34.53, 40.11, 41.34, 45.23, 59.41, 65.49, 68.97, 69.51, 175.35, 211.13 and 212.86 ppm, which shows that the final product obtained by the second embodiment is a hyperbranched polymer which takes ethoxylated pentaerythritol as a core, and dithiocarboxylate as side functional group and terminal functional group.

Third Embodiment

Under nitrogen protection, add 30.00 g (0.50 mol) of ethylenediamine (EDA) and 32.40 g of ethanol to a round-bottomed flask with a stirred, a reflux condenser, a constant pressure dropping funnel and a thermometer, stir and cool to 5° C.; and then slowly add 52.80 g (0.05 mol, 50%) of an ethanol solution containing ethoxylated pentaerythritol tetraacrylate (EO-PETA) drop by drop through the constant pressure dropping funnel, react for 24 h at 25° C.; and remove excessive ethylenediamine and ethanol through vacuum distillation for 4 h at 95° C., and obtain a light amber viscous product, namely, an intermediate product ethoxylated pentaerythritol tetra((N-(2-aminoethyl))-3-alaninate) hyperbranched polymer (EO-PETA/EDA); and then add 125.00 g of deionized water into the intermediate product, evenly stir, cool to 5° C., slowly add 32.80 g (50%, 0.41 mol) of sodium hydroxide aqueous solution through the constant pressure dropping funnel; and then slowly add 31.92 g (0.42 mol) of carbon disulfide through the constant pressure dropping funnel for obtaining a mixture, wherein a temperature of the mixture is less than 5° C. through controlling an addition speed during an addition process; and then react for 1 h at 5° C.; and then increase the temperature to 25° C. and react for 5 h at 25° C.; and then add 400 g of methanol, stand overnight, precipitate a white solid, filter, and dry at low temperature to obtain 72.17 g of a final product, namely, the ethoxylated pentaerythritol core hyperbranched polymer with dithiocarboxylate as side group and terminal group (EO-PETA/EDA/DTC) with a yield of 94.86%.

Chemical shifts of the characteristic absorption peak of $^{13}C$ nuclear magnetic resonance spectrum ($D_2O$) of the final product are respectively: 34.52, 40.25, 41.25, 45.16, 59.29, 65.41, 68.39, 69.44, 175.54, 211.26 and 212.27 ppm, which shows that the final product obtained by the third embodiment is a hyperbranched polymer which takes ethoxylated pentaerythritol as a core, and dithiocarboxylate as side functional group and terminal functional group.

First Control Example

Commercially available sodium diethyldithiocarbamate solid

Second Control Example

Commercially available disodium N,N'-bis-(dithiocarboxy) ethylenediamine

A preparation method of the disodium N,N'-bis-(dithiocarboxy) ethylenediamine comprises steps of dissolving 30.00 g of ethylenediamine into 152 g of pure water, adding 76.00 g of carbon disulfide and 80 g of sodium hydroxide aqueous solution with a mass concentration of 50% drop by drop at less than 20° C., reacting at 30° C. for 3 h, adding 300 g of ethanol, standing for 1 h, filtering and drying at 80° C. to obtain the disodium N,N'-bis-(dithiocarboxy) ethylenediamine.

Fourth Embodiment

Treatment of Copper-Containing Electroplating Wastewater

The final product obtained by the first embodiment, and the chelating agents provided by the first control example and the second control example are used to treat copper-containing electroplating wastewater (pH 2.6, $Cu^{2+}$ 36.28 $mg \cdot L^{-1}$ and $Ni^{2+}$ 3.91 $mg \cdot L^{-1}$) from an electroplating factory in Shanghai, China respectively.

A treatment method comprises steps of: (1) adjusting a pH value of the electroplating wastewater to 8.0 with NaOH; (2) taking 500 mL of the electroplating wastewater, stirring at 150 rpm for 10 min with a stirrer, simultaneously adding a chelating agent on a base of dry basis; (3) performing a next step for the chelating agent provided by the first embodiment, or respectively adding a polyacrylamide (PAM) aqueous solution with a mass concentration of 0.1% and a density of 50 $mg \cdot L^{-1}$ to the chelating agents provided by the first control example and the second control example, stirring at 50 rpm for 5 min; and (4) standing for 30 min, filtering and determining a heavy metal content with ICP-MS (7700, Agilent). Determination results are shown in Table 1.

TABLE 1

Result comparison of treatment on electroplating wastewater ($Cu^{2+}$ 36.28 $mg \cdot L^{-1}$ and $Ni^{2+}$ 3.91 $mg \cdot L^{-1}$)

| No. | Chelating agent Concentration ($mg \cdot L^{-1}$) | Whether PAM is added | Content of residual heavy metals ($mg \cdot L^{-1}$) $Cu^{2+}$ | $Ni^{2+}$ | Precipitation |
|---|---|---|---|---|---|
| First Embodiment | 240 | No | 0.278 | 1.036 | Large particles, dense, fast settling, easy separation, less sludge |
|  | 250 | No | 0.113 | 0.014 |  |
|  | 260 | No | 0.024 | 0.003 |  |
| First Control Example | 240 | Yes | 2.293 | 3.588 | Fine particles, slow settling, need PAM for coagulation, and large amount of sludge |
|  | 260 | Yes | 1.113 | 2.006 |  |
|  | 280 | Yes | 1.026 | 1.057 |  |
| Second Control Example | 240 | Yes | 0.293 | 1.588 | Small particles, slow settling, need PAM to help coagulation, and large amount of sludge |
|  | 260 | Yes | 0.275 | 1.006 |  |
|  | 280 | Yes | 0.226 | 0.257 |  |
| Special heavy metal emission limit standards in Table 3 of "Emission Standards of Electroplating Pollutant (GB21900-2008)" |  |  | 0.3 | 0.1 | — |

It is able to be seen from Table 1 that the final product according to the first embodiment of the present invention has a good removal effect on $Cu^{2+}$ and $Ni^{2+}$, and in the case of adding the chelating agent with a concentration of 250 $mg \cdot L^{-1}$ and above, the concentration of residual ions is lower than special heavy metal emission limit standards in Table 3 of "Emission Standards of Electroplating Pollutant (GB21900-2008)". Judging from the morphology of the deposit formed by the chelating agents with heavy metals, the floc deposits, formed by the chelating agent according to the first embodiment of the present invention with the heavy metals, are large and dense in particles, and have a fast settling speed, do not need PAM to help coagulation, so the sludge is less. However, the floc deposits, formed by sodium diethyldithiocarbamate of the first control example with heavy metals, are small in particles, have a slow settling speed, need PAM to help coagulation, so the sludge is much, which is unable to meet special heavy metal emission limit standards in Table 3 of "Emission Standards of Electroplating Pollutant (GB21900-2008)". The floc deposits, formed by disodium N,N'-bis-(dithiocarboxy) ethylenediamine of the second control example with heavy metals, are small in particles, have a slow settling speed, need PAM to help coagulation, so the sludge is much, which is also unable to meet special heavy metal emission limit standards in Table 3 of "Emission Standards of Electroplating Pollutant (GB21900-2008)".

Fifth Embodiment

Treatment of Complex State Nickel-Containing Wastewater

The final products obtained by the first embodiment and the second embodiment, and the chelating agents provided by the first control example and the second control example are used to treat EDTA complex state nickel-containing wastewater (pH 12.6, $Ni^{2+}$ 10.59 $mg \cdot L^{-1}$) from an electroplating factory in Shanghai, China respectively.

A treatment method comprises steps of: (1) adjusting a pH value of the electroplating wastewater to 5.0 with HCl; (2) taking 500 mL of the electroplating wastewater, stirring at 150 rpm for 10 min with a stirrer, simultaneously adding a chelating agent on a base of dry basis; (3) stirring at 50 rpm for 30 min; (4) performing a next step for the chelating agents provided by the second embodiment and the third embodiment, or respectively adding a polyacrylamide (PAM) aqueous solution with a mass concentration of 0.1% and a density of 50 $mg \cdot L^{-1}$ to the chelating agents provided by the first control example and the second control example, stirring at 50 rpm for 5 min; and (4) standing for 30 min, filtering and determining a heavy metal content with ICP-MS (7700, Agilent). Determination results are shown in Table 2.

TABLE 2

Result comparison of treatment on EDTA complex state nickel-containing wastewater ($Ni^{2+}$ 10.59 $mg \cdot L^{-1}$)

| No. | Chelating agent Concentration ($mg \cdot L^{-1}$) | Whether PAM is added | Content of residual $Ni^{2+}$ ($mg \cdot L^{-1}$) | Precipitation |
|---|---|---|---|---|
| Second Embodiment | 70 | No | 1.036 | Large particles, dense, fast settling, easy separation, does not need PAM |
|  | 80 | No | 0.319 |  |
|  | 90 | No | 0.025 |  |

TABLE 2-continued

Result comparison of treatment on EDTA complex state nickel-containing wastewater ($Ni^{2+}$ 10.59 mg·$L^{-1}$)

| No. | Chelating agent Concentration (mg·$L^{-1}$) | Whether PAM is added | Content of residual $Ni^{2+}$ (mg·$L^{-1}$) | Precipitation |
|---|---|---|---|---|
| Third Embodiment | 70 | No | 1.012 | Large particles, dense, fast settling, easy separation, does not need PAM |
|  | 80 | No | 0.331 | |
|  | 90 | No | 0.015 | |
| First Control Example | 70 | Yes | 3.104 | Fine particles, cloudy solution, does not settle and needs PAM for coagulation |
|  | 80 | Yes | 2.952 | |
|  | 90 | Yes | 2.927 | |
|  | 120 | Yes | 2.893 | |
| Second Control Example | 70 | Yes | 2.029 | Small particles, slow settling, needs PAM to help coagulation, and large amount of sludge |
|  | 80 | Yes | 1.832 | |
|  | 90 | Yes | 1.257 | |
|  | 120 | Yes | 0.923 | |
|  | 150 | Yes | 0.087 | |
| Special heavy metal emission limit standards in Table 3 of "Emission Standards of Electroplating Pollutant (GB21900-2008)" | | | 0.1 | — |

It is able to be seen from Table 2 that the final products according to the second embodiment and the third embodiment of the present invention have a good removal effect on $Ni^{2+}$, and in the case of adding the chelating agent with a concentration of 90 mg·$L^{-1}$, complex nickel is able to be directly settled without breaking the complex, the concentration of residual ions is lower than special heavy metal emission limit standards in Table 3 of "Emission Standards of Electroplating Pollutant (GB21900-2008)". Moreover, no need for PAM to help coagulation, so the sludge is less. However, the floc deposits, formed by sodium diethyldithiocarbamate of the first control example with heavy metals, are unable to meet special heavy metal emission limit standards in Table 3 of "Emission Standards of Electroplating Pollutant (GB21900-2008)". For disodium N,N'-bis-(dithiocarboxy) ethylenediamine of the second control example, when the concentration is 150 mg·$L^{-1}$, special heavy metal emission limit standards in Table 3 of "Emission Standards of Electroplating Pollutant (GB21900-2008)" is able to be met. And settlement separation requires PAM, so the sludge is much.

It is able to be seen from the above embodiments that the hyperbranched polymer as the heavy metal chelating agent provided by the present invention has a wide application range while processing heavy metals, does not need to add coagulant, has a good processing effect, and has both chelation and flocculation functions.

The above are only the preferred embodiments of the present invention. It should be pointed out that for those skilled in the art, without departing from the principles of the present invention, several improvements and modifications are able to be made. These improvements and modifications should also be regarded as the protective scope of the present invention.

What is claimed is:

1. An ethoxylated pentaerythritol core hyperbranched polymer with dithiocarboxylate as side group and terminal group, which has a chemical formula of C[$CH_2OCH_2CH_2OCOCH_2CH_2N$(CSSM) $CH_2CH_2NHCSSM$]$_4$, wherein M is $Na^+$, $K^+$ or $NH_4^+$; and a structural formula of

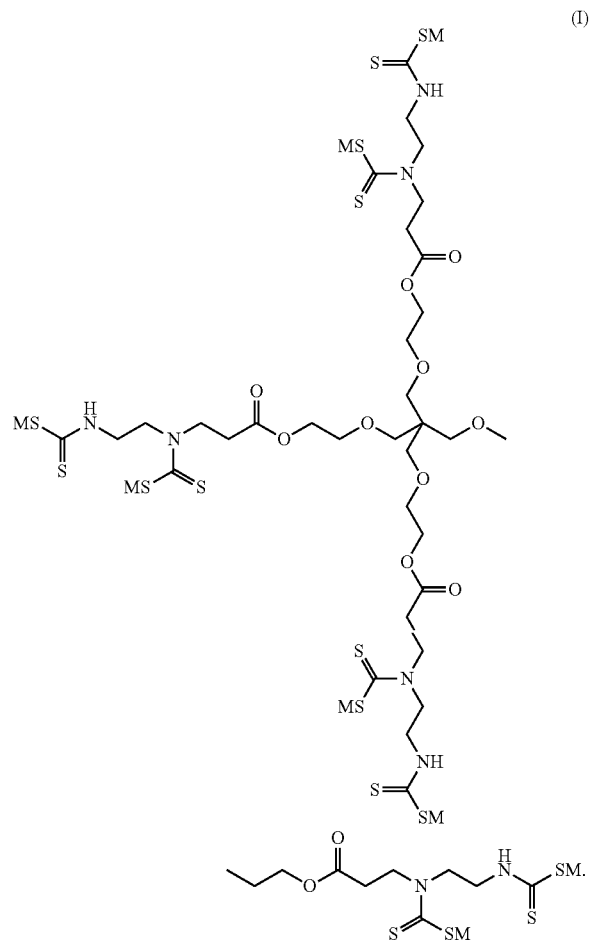

2. A preparation method of an ethoxylated pentaerythritol core hyperbranched polymer with dithiocarboxylate as side group and terminal group, wherein:
the ethoxylated pentaerythritol core hyperbranched polymer with dithiocarboxylate as side group and terminal group has a chemical formula of C[CH$_2$OCH$_2$CH$_2$OCOCH$_2$CH$_2$N(CSSM)CH$_2$CH$_2$NHCSSM]$_4$, wherein M is Na$^+$, K$^+$ or NH$_4^+$; and a structural formula of aqueous solution of the ethoxylated pentaerythritol core hyperbranched polymer with dithiocarboxylate as side group and terminal group; and (I)

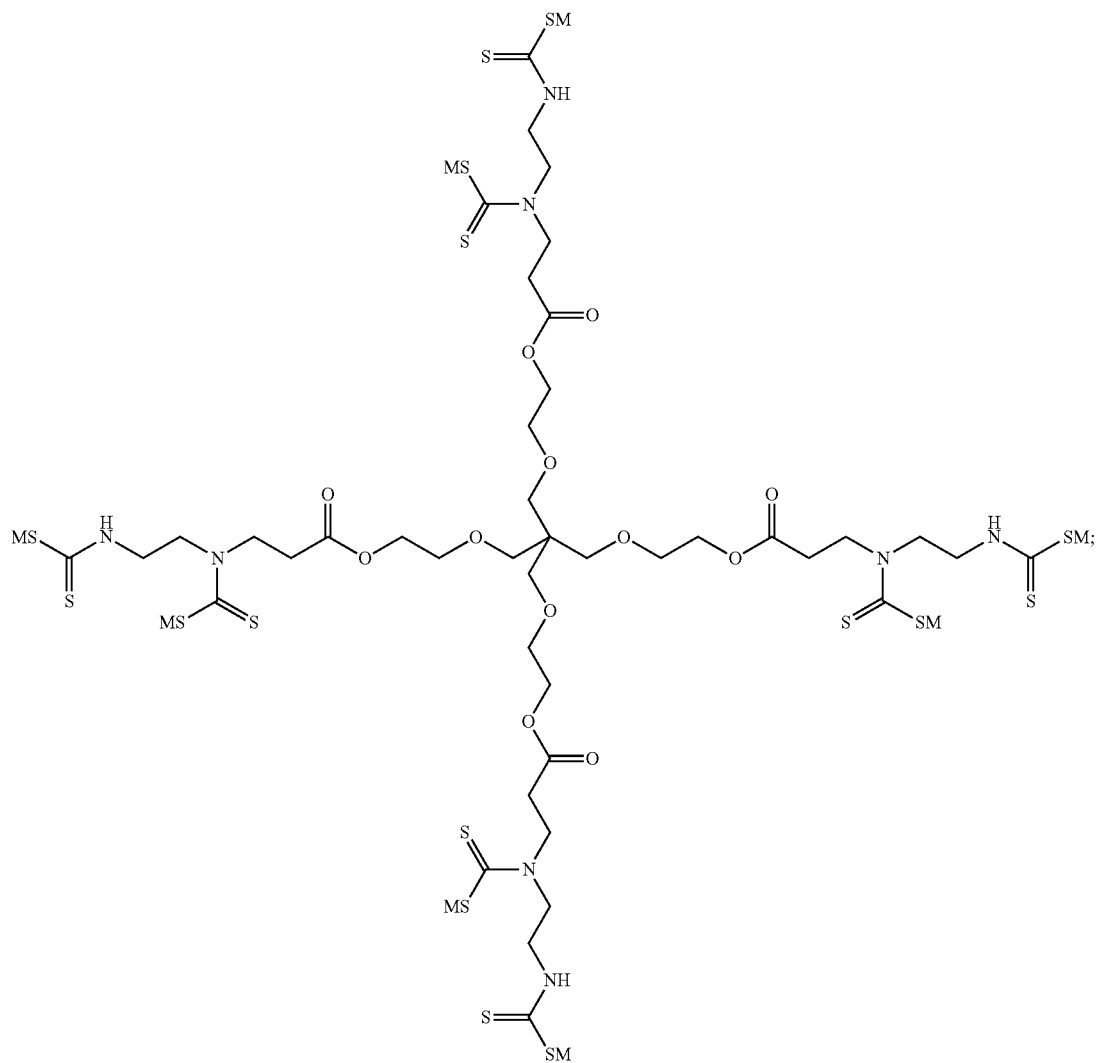

the preparation method comprises steps of:

(1) under nitrogen protection, adding ethylenediamine (EDA) and a first amount of low-carbon alcohol to a reaction vessel with a stirrer, a reflux device and a thermometer, evenly stirring, slowly adding a low-carbon alcohol solution containing ethoxylated pentaerythritol tetraacrylate (EO-PETA) drop by drop, performing a first addition reaction; and then removing low-carbon alcohol solvent and excessive ethylenediamine through vacuum distillation, and obtaining a light amber viscous product, which is an intermediate product ethoxylated pentaerythritol tetra((N-(2-aminoethyl))-3-alaninate) hyperbranched polymer;

(2) slowly adding water, alkaline solution and carbon disulfide drop by drop to the ethoxylated pentaerythritol tetra((N-(2-aminoethyl))-3-alaninate) hyperbranched polymer obtained by the step of (1), performing a second addition reaction, and obtaining an aqueous solution of the ethoxylated pentaerythritol core hyperbranched polymer with dithiocarboxylate as side group and terminal group; and (3) adding a second amount of low-carbon alcohol to the aqueous solution of the ethoxylated pentaerythritol core hyperbranched polymer with dithiocarboxylate as side group and terminal group obtained by the step (3), evenly stirring, precipitating a solid product, filtering and drying the solid product to obtain the ethoxylated pentaerythritol core hyperbranched polymer with dithiocarboxylate as side group and terminal group.

3. The preparation method according to claim 2, wherein each of the first amount of low-carbon alcohol in the step (1) and the second amount of low-carbon alcohol in the step (2) is one member selected from the group consisting of methanol, ethanol, propanol and ethylene glycol.

4. The preparation method according to claim 2, wherein a molar ratio of ethylenediamine and ethoxylated pentaerythritol tetraacrylate in the step (1) is in a range of (4-10): 1.

5. The preparation method according to claim 2, wherein the first addition reaction in the step (1) has a reaction temperature in a range of 25-35° C., and a reaction time in a range of 24 to 48 h.

6. The preparation method according to claim 2, wherein the vacuum distillation in the step (1) has a temperature in a range of 80 to 100° C., and a time in a range of 3 to 5 h.

7. The preparation method according to claim 2, wherein the alkaline solution in the step (2) is sodium hydroxide solution, potassium hydroxide solution or ammonium hydroxide.

8. The preparation method according to claim 7, wherein in the step (2), a molar ratio of the ethoxylated pentaerythritol tetra((N-(2-aminoethyl))-3-alaninate) hyperbranched polymer, carbon disulfide and alkaline is in a range of 1:(8.0-9.0):(8.0-9.0).

9. The preparation method according to claim 2, wherein the second addition reaction in the step (2) has a reaction temperature in a range of 25-40° C., and a reaction time in a range of 3 to 5 h.

10. A method for treating heavy metal wastewater and heavy metal waste, comprising applying an ethoxylated pentaerythritol core hyperbranched polymer with dithiocarboxylate as side group and terminal group as a heavy metal chelating agent, wherein:

the ethoxylated pentaerythritol core hyperbranched polymer with dithiocarboxylate as side group and terminal group has a chemical formula of $C[CH_2OCH_2CH_2OCOCH_2CH_2N(CSSM)CH_2CH_2NHCSSM]_4$, wherein M is $Na^+$, $K^+$ or $NH_4^+$; and a structural formula of

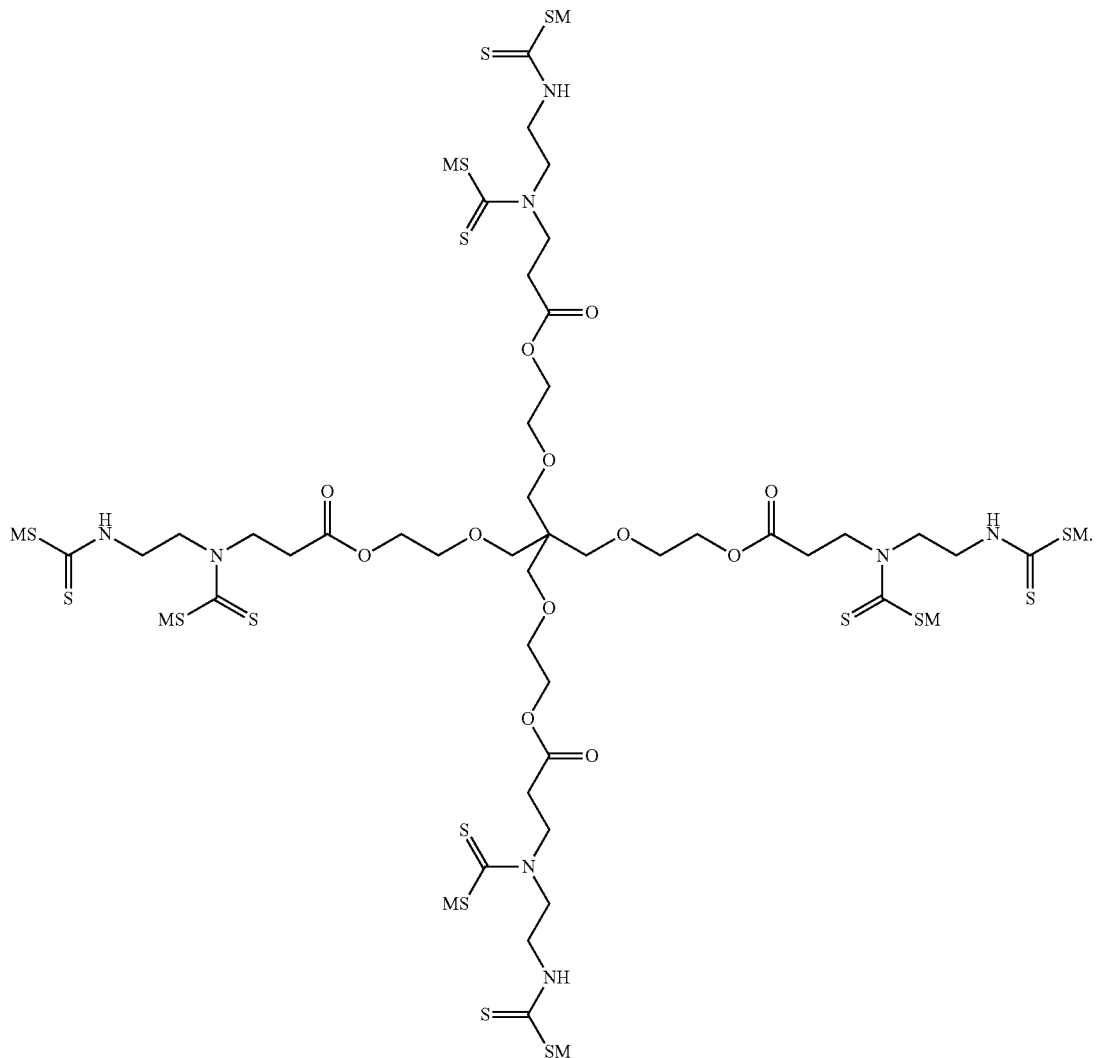

(I)

* * * * *